United States Patent
Chan et al.

(10) Patent No.: US 10,063,440 B2
(45) Date of Patent: *Aug. 28, 2018

(54) METHOD AND SYSTEM FOR MEASURING PACKET LOSS

(71) Applicant: Viavi Solutions Inc., Milpitas, CA (US)

(72) Inventors: Lai-chong May Chan, Colorado Springs, CO (US); Gabriel Black, Colorado Springs, CO (US)

(73) Assignee: VIAVI Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/255,437

(22) Filed: Sep. 2, 2016

(65) Prior Publication Data

US 2016/0373329 A1 Dec. 22, 2016

Related U.S. Application Data

(63) Continuation of application No. 14/271,051, filed on May 6, 2014, now Pat. No. 9,438,497.

(60) Provisional application No. 61/820,060, filed on May 6, 2013.

(51) Int. Cl.
*H04L 12/26* (2006.01)

(52) U.S. Cl.
CPC ........ *H04L 43/0835* (2013.01); *H04L 43/026* (2013.01); *H04L 43/0858* (2013.01); *H04L 43/12* (2013.01)

(58) Field of Classification Search
CPC ............... H04L 43/0835; H04L 43/026; H04L 43/0858; H04L 43/12
See application file for complete search history.

(56) References Cited

U.S. PATENT DOCUMENTS

| | | |
|---|---|---|
| 7,292,537 B2 | 11/2007 | Chareranoon |
| 7,573,914 B2 | 8/2009 | Ilnicki |
| 7,689,854 B2 | 3/2010 | Ilnicki |
| 7,760,663 B2 | 7/2010 | Ilnicki |
| 7,817,568 B2 | 10/2010 | Paik et al. |
| 7,894,356 B2 | 2/2011 | Mottishaw |
| 7,924,739 B2 | 4/2011 | Sen et al. |
| 7,961,637 B2 | 6/2011 | McBeath |
| 7,983,183 B2 | 7/2011 | Ostrup et al. |
| 8,270,309 B1 | 9/2012 | Jones |
| 8,331,246 B2 | 12/2012 | Ostrup |
| 8,427,966 B2 | 4/2013 | Ilnicki |
| 8,451,734 B2 | 5/2013 | Cociglio |
| 8,661,292 B2 | 2/2014 | Stevens et al. |

(Continued)

FOREIGN PATENT DOCUMENTS

WO WO 2012/082033 A1 6/2012

*Primary Examiner* — Ian N Moore
*Assistant Examiner* — Justin T Van Roie
(74) *Attorney, Agent, or Firm* — Harrity & Harrity, LLP

(57) ABSTRACT

In a method of measuring packet loss, a flow of packets is identified at first and second locations in a network. The packets in the flow are counted at each of the first and second locations to provide first and second packet counts, respectively. When a trigger packet in the flow is identified at each of the first and second locations, the first and second packet counts are latched to provide latched first and second packet counts corresponding to same packets in the flow. The latched first and second packet counts are compared to measure packet loss between the first and second locations.

20 Claims, 4 Drawing Sheets

(56) References Cited

U.S. PATENT DOCUMENTS

| | | |
|---|---|---|
| 9,438,497 B2 | 9/2016 | Chan et al. |
| 2003/0115321 A1 | 6/2003 | Edmison et al. |
| 2005/0238017 A1 | 10/2005 | Delegue et al. |
| 2006/0268718 A1 | 11/2006 | Jones |
| 2007/0268882 A1 | 11/2007 | Breslau et al. |
| 2011/0255440 A1 | 10/2011 | Cociglio et al. |
| 2011/0305149 A1 | 12/2011 | Scott et al. |
| 2012/0026869 A1 | 2/2012 | Wang |
| 2012/0250519 A1 | 10/2012 | Stevens et al. |
| 2013/0179821 A1 | 7/2013 | Bauer et al. |
| 2013/0215752 A1 | 8/2013 | Hidai |
| 2013/0223274 A1 | 8/2013 | Cociglio et al. |
| 2014/0119231 A1 | 5/2014 | Chan et al. |

METHOD AND SYSTEM FOR MEASURING PACKET LOSS

CROSS-REFERENCE TO RELATED APPLICATIONS

This application is a continuation of U.S. patent application Ser. No. 14/271,051, filed May 6, 2014 (now U.S. Pat. No. 9,438,497), which claims priority from U.S. Provisional Patent Application No. 61/820,060, filed May 6, 2013, the disclosures of which are incorporated herein by reference.

TECHNICAL FIELD OF THE INVENTION

The present invention relates to measuring packet loss. More particularly, the present invention relates to measuring hop-to-hop packet loss.

BACKGROUND OF THE INVENTION

In one conventional method for measuring packet loss, a traffic generator generates test packets at one end of a network path, and a plurality of probes located at different locations along the network path count the test packets as they pass. If there is no packet loss, the number of test packets counted, i.e., the packet count, at each probe should equal the number of test packets generated. By comparing the packet counts to the number of test packets generated, the number of lost test packets, i.e., the packet loss, may be measured. For example, if 100 test packets are generated at one end of the network path, and first and second probes along the network path each count 100 test packets, but a third probe along the network path counts 99 test packets, then 1 packet was lost between the second and third probes.

An out-of-band request packet is sent to each probe in order to obtain the packet counts. However, if the test packets are generated continuously, different numbers of test packets will have passed each probe at any point in time because the probes are located at different locations along the network path. Even if they are obtained at the same point in time, the packet counts will be out of sync, i.e., will not correspond to the same test packets, and cannot be directly compared. Moreover, because the packet counts are requested out-of-band, the packet counts are further out of sync. In order to ensure that the packet counts at each probe are synchronized, i.e., correspond to the same test packets, the test packets are generated in bursts separated by quiet periods, rather than being generated continuously. The packet counts at each probe are requested after the burst of test packets has passed all of the probes and are then compared to measure packet loss. Unfortunately, this method does not provide real-time measurements. Moreover, the method is limited to active measurements using generated test packets, and requires the use of quiet periods in which measurements are not possible.

Other conventional methods have been developed which overcome some of these problems. In a method described in U.S. Pat. No. 8,270,309 to Jones, issued on Sep. 18, 2012, which is incorporated herein by reference, a modified internet control message protocol (ICMP) packet is inserted into an existing flow of packets and is used to latch packets counts for the flow at first and second reference nodes. By comparing the latched packet counts, packet loss between the first and second reference nodes is measured. In a method described in U.S. Pat. No. 8,451,734 to Cociglio et al., issued on May 28, 2013, which is incorporated herein by reference, different blocks of packets in a flow are marked with different features at a transmitting node. Packets marked with a same feature are counted at the transmitting node and at a receiving node to provide packet counts corresponding to a same block of packets. By comparing the packet counts, packet loss between the transmitting and receiving nodes is measured. Unfortunately, both of these methods require altering existing network traffic, by inserting additional packets or by marking packets, respectively.

SUMMARY OF THE INVENTION

Accordingly, one aspect of the present invention relates to a method of measuring packet loss, the method comprising: identifying a flow of packets at each of first and second locations in a network; counting the packets in the flow at each of the first and second locations to provide first and second packet counts, respectively; identifying a trigger packet in the flow at each of the first and second locations; latching the first and second packet counts upon identifying the trigger packet at each of the first and second locations, respectively, to provide latched first and second packet counts corresponding to same packets in the flow; and comparing the latched first and second packet counts to measure packet loss between the first and second locations.

Another aspect of the present invention relates to a system for measuring packet loss, the system comprising: a first probe at a first location in a network for identifying a flow of packets, for counting the packets in the flow to provide a first packet count, for identifying a trigger packet in the flow, and for latching the first packet count upon identifying the trigger packet to provide a latched first packet count; a second probe at a second location in the network for identifying the flow of packets, for counting the packets in the flow to provide a second packet count, for identifying the trigger packet, and for latching the second packet count upon identifying the trigger packet to provide a latched second packet count, wherein the latched first and second packet counts correspond to same packets in the flow; and a measurement unit for comparing the latched first and second packet counts to measure packet loss between the first and second locations.

BRIEF DESCRIPTION OF THE DRAWINGS

The present invention will be described in greater detail with reference to the accompanying drawings, which represent exemplary embodiments thereof, wherein.

DETAILED DESCRIPTION OF THE INVENTION

The present invention provides a method and system for measuring packet loss, which may be used for passive or active measurements. Advantageously, when used for passive measurements, the present invention does not require that existing network traffic be altered in any way. When used for active measurements, the present invention does not require the use of quiet periods or finite bursts of test packets.

Figure 1:
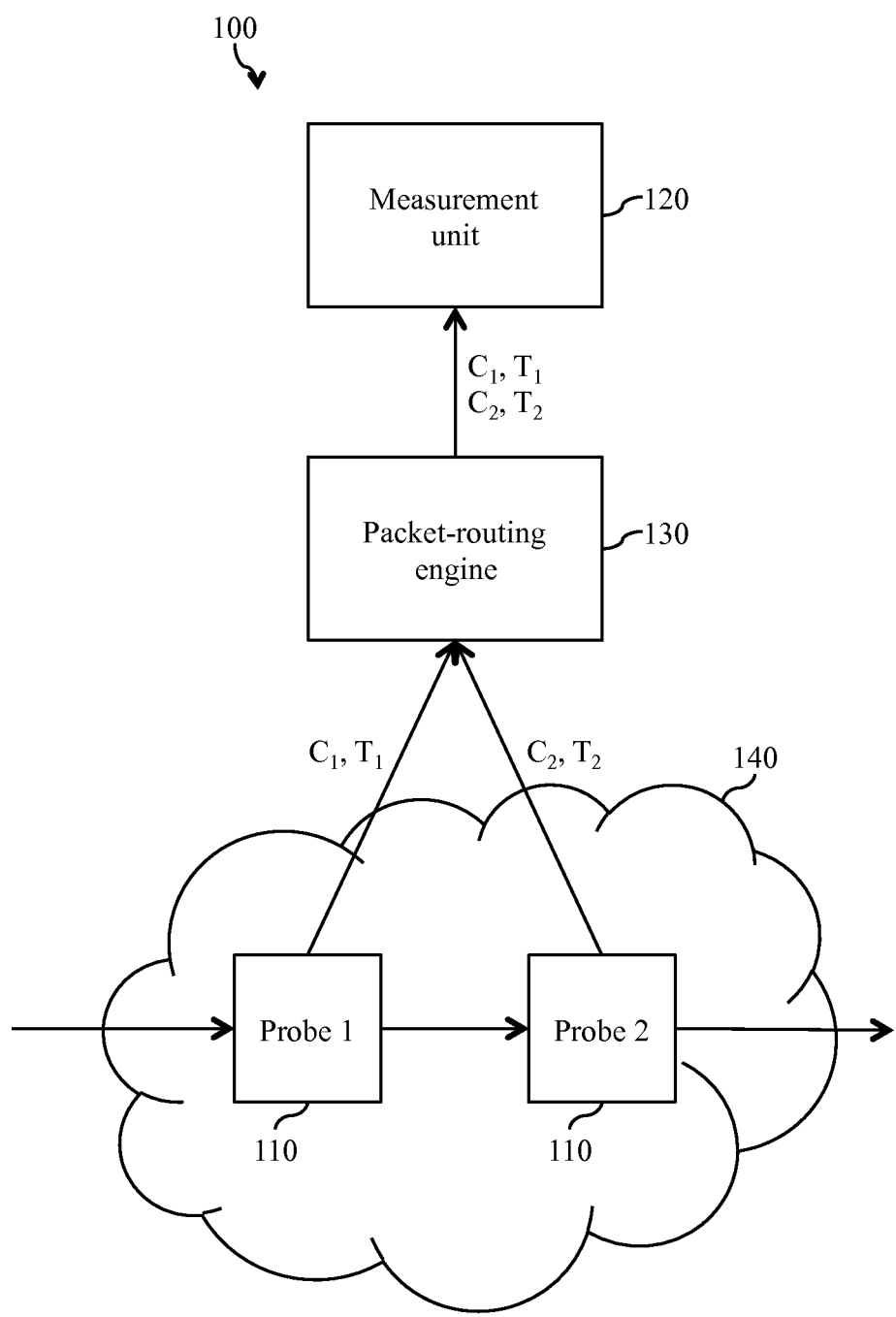
FIG. 1 is a schematic illustration of a first embodiment of a system for measuring packet loss.

With reference to FIG. 1, a first embodiment of a system 100 for measuring packet loss is used for passive measurements. The system 100 includes a plurality of probes 110, e.g., 2 to 500 probes, and a measurement unit 120. By way of example, a system 100 including two probes 110 is illustrated in FIG. 1. Optionally, the system 100 may also include a packet-routing engine 130.

The probes 110 are located at different locations in a network 140 under test, i.e., within the network 140 and/or at the edge of the network 140. The network 140 under test is a packet-based network and is, typically, Internet protocol (IP)-based. For example, the network 140 under test may be the Internet, a wide area network (WAN), a local area network (LAN), or a mobile network. Typically, the probes 110 are located at network nodes in the network 140 under test. For example, a probe 110 may be installed at a switch, a router, an access node, e.g., a digital subscriber line access multiplexer (DSLAM), a broadband remote access server (BRAS), a cable modem termination system (CMTS), or an optical line terminal (OLT), or a mobile network node, e.g., a Node B, an evolved Node B (eNodeB), a radio network controller (RNC), or a mobility management entity (MME). Alternatively, the probes 110 may be incorporated into network nodes.

The measurement unit 120 and the optional packet-routing engine 130 may be located in the network 140 under test or in another network. The measurement unit 120 is in network communication with the probes 110, optionally, via the packet-routing engine 130.

The probes 110 may be implemented as hardware, software, or a combination thereof. When implemented as hardware, the probes 110 are, preferably, inline unaddressed devices. For example, the probes 110 may be eavesdropping devices, intelligent packet directors (IPDs), microprobes, transceivers, or SFProbes™, i.e., modified standard small form-factor pluggable (SFP) transceivers. Examples of suitable hardware implementations are disclosed in U.S. Pat. No. 8,427,966 to Ilnicki et al., issued on Apr. 23, 2013, in U.S. Pat. No. 8,661,292 to Stevens et al., issued on Feb. 25, 2014, in U.S. Patent Application Publication No. 2011/0305149 to Scott et al., published on Dec. 15, 2011, and in U.S. Patent Application Publication No. 2013/0179821 to Bauer et al., published on Jul. 11, 2013, which are incorporated herein by reference. When implemented as software, typically, the probes 110 are embodied in non-transitory computer-readable storage media, e.g., memory, and the actions carried out by each probe 110 are executed by the processor of a hardware device, e.g., a network server or a general purpose computer.

The measurement unit 120 and the optional packet-routing engine 130 may also be implemented as hardware, software, or a combination thereof. Typically, the measurement unit 120 and the optional packet-routing engine 130 are implemented as software embodied in non-transitory computer-readable storage media, e.g., memory, and the actions carried out by each of the measurement unit 120 and the optional packet-routing engine 130 are executed by the processor of a hardware device, e.g., a network server or a general purpose computer.

In operation, the probes 110 receive network traffic from the network 140 under test and monitor the network traffic to identify a flow of packets passing the probes 110. Simultaneously, the probes 110 monitor the network traffic to identify one or more predetermined packets in the flow which serve as trigger packets.

All the packets in the flow, including the trigger packets, have one or more common attributes, such as a common protocol, source address, source port, destination address, and/or destination port. Typically, the packets in the flow have at least a common source address and destination address. On the other hand, the packets in the flow may be uniquely identified at the probes 110 by an attribute that varies from packet to packet within the flow, such as an identifier, a sequence number, or a checksum. Such an attribute is used to distinguish the trigger packets from other packets in the flow. The distinguishing attribute may be located anywhere in the packet, e.g., in an IP header, in a transport-layer header, in an application-layer header, or even in the packet payload. Advantageously, there is no need to mark the trigger packets or to actively insert trigger packets into the flow. The flow is part of the existing network traffic and is not altered in any way.

The probes 110 are each configured, i.e., programmed, with a flow filter that defines the flow of interest and a trigger filter that defines the trigger packets, i.e., the predetermined packets, in the flow. In general, all the probes 110 are configured with the same flow and trigger filters. The flow filter and the trigger filter are configured by the measurement unit 120, optionally, via the packet-routing engine 130. Examples of suitable techniques for configuring filters are disclosed in U.S. Pat. No. 7,760,663 to Ilnicki et al, issued on Jul. 20, 2010, and in U.S. Pat. No. 8,661,292 to Stevens et al., issued on Feb. 25, 2014, which are incorporated herein by reference.

The flow is identified by matching one or more common attributes, e.g., protocol, source address, source port, destination address, and/or destination port, of the packets in the flow to the flow filter. Typically, the flow filter defines values of at least an IP source address field and an IP destination address field. Preferably, the flow filter also defines an entire space of a header field or payload sequence used by the trigger filter.

The trigger packets are identified by matching at least one distinguishing attribute, e.g., an identifier, a sequence number, or a checksum, of the trigger packets to the trigger filter. Typically, the trigger filter defines a subset of values of at least one header field, such as an IP version 4 (IPv4) identifier field, an IP security (IPsec) sequence number field, a transport-layer sequence number field, a user datagram protocol (UDP) checksum field, or an application-layer sequence number field, e.g., a moving picture experts group (MPEG) transport stream (TS) continuity counter field. Alternatively, the trigger filter may define a subset of values of a sequence of bits at a given offset in the packet payload. The least significant bits of the header field or payload sequence are set by the filter, so that the trigger packets are more evenly spaced. Preferably, at least the 5 least significant bits are set to provide a trigger frequency of at most $\frac{1}{32}$.

When implemented as a hardware filter, it is often difficult to set a trigger filter that will not yield false positives. In some embodiments, it is, therefore, preferable to capture, i.e., copy, the trigger packets for deeper packet analysis by the measurement unit 120, in order to determine whether the trigger packet is indeed the same packet at each probe 110. The measurement unit 120 may implement an algorithm to perform packet matching and/or to remove false positives.

The probes 110 each inspect the packets in the network traffic as they are received to determine whether they match the flow filter and belong to the flow, and to determine whether they match the trigger filter and serve as trigger packets. The network traffic is filtered passively, meaning that packets are not altered and the existing network traffic is not disrupted. Typically, the packets are examined at full-duplex line-rate speeds.

The probes 110 each count the packets determined to belong to the flow to provide a packet count for the flow at each probe 110, e.g., $C_1$ and $C_2$ in FIG. 1. When a packet in the network traffic matches the flow filter at each probe 110, a packet counter in each probe 110 is incremented by one. Typically, a byte count of the packet is also added to a byte counter in each probe 110 in order to provide a byte count for the flow at each probe 110.

The probes 110 may also collect other data and statistics as desired. For example, in addition to counting the packets in the flow, the probes 110 may count other packets in the network traffic to provide counts relating to the network traffic as a whole, i.e., total packet and byte counts, and/or to provide counts relating to subsets of the network traffic, e.g., protocol-specific packet and byte counts. The probes 110 may also track digital diagnostic information relating the probes 110 themselves, e.g., internal temperature, internal voltage, optical transmit bias, optical transmit power, and/or optical receive power.

The probes 110 each continuously count the packets in the flow, and continuously collect any other data and statistics that are desired. Upon identifying a trigger packet, the packet and byte counts for the flow at each probe 110 are latched, as are any other data and statistics collected at each probe 110. When a packet in the network traffic matches the trigger filter, the current values of the packet and byte counts for the flow at each probe 110 are copied to a memory buffer in that probe 110. The current values of any other data and statistics are also copied to the memory buffer. Meanwhile, the packet and byte counts for the flow and any other data and statistics collected at each probe 110 continue to be updated as the network traffic passes through that probe 110.

In general, the trigger packet is one of a series of trigger packets matching the trigger filter, and the packet and byte counts for the flow and any other data and statistics collected at each probe 110 are iteratively latched upon identifying each trigger packet in the series.

In this manner, a snapshot of the packet and byte counts for the flow is recorded at each probe 110 whenever a trigger packet is identified. All the probes 110 are triggered to take a snapshot of the same packets in the flow, the packets preceding the trigger packet. Thereby, latched packet and byte counts are obtained at each probe 110 that correspond to the same packets in the flow.

Typically, the probes 110 each record a trigger timestamp in the memory buffer whenever a trigger packet is identified, which represents the time at which the trigger packet was identified at each probe 110. The probes 110 are, typically, synchronized with a global time source, such as a global positioning system (GPS), network time protocol (NTP), or IEEE 1588 master clock, as disclosed, for example, in U.S. Pat. No. 7,573,914 to Ilnicki et al., issued on Aug. 11, 2009, and in U.S. Pat. No. 7,689,854 to Ilnicki et al., issued on Mar. 30, 2010, which are incorporated herein by reference.

The probes 110 each generate result packets, which are transmitted from each probe 110 to the measurement unit 120, optionally, via the packet-routing engine 130. A result packet includes the latched packet and byte counts for the flow at a probe 110, as well as the corresponding trigger timestamp, i.e., the timestamp of the trigger packet that latched the counts. Any other data and statistics collected at the probe 110 may also be included in the result packet. Preferably, the result packet includes a copy of the trigger packet or a portion thereof to enable deeper packet analysis by the measurement unit 120.

Typically, the result packet further includes an indicator that indicates to the measurement unit 120 that the result packet is for a trigger packet, and a probe identifier that identifies the probe 110 at which the trigger packet was identified. Often, the result packet also includes a trigger sequence number that identifies the trigger packet that latched the counts. However, when the spacing between the trigger packets is large enough, the results packets can be grouped as belonging to a same trigger packet without using a trigger sequence number.

Preferably, the result packet is an in-band result packet, e.g., a filter result packet (FRP), which is generated whenever a trigger packet is identified. The in-band result packet is inserted back into the network traffic for routing to the measurement unit 120 without disrupting the existing network traffic. Examples of suitable techniques for using in-band result packets are disclosed in U.S. Pat. No. 7,894,356 to Mottishaw et al., issued on Feb. 22, 2011, in U.S. Patent Application Publication No. 2011/0305149 to Scott et al., published on Dec. 15, 2011, in U.S. Patent Application Publication No. 2012/0250519 to Stevens et al., published on Oct. 4, and in U.S. Patent Application Publication No. 2013/0215752 to Hidai, published on Aug. 22, 2013, which are incorporated herein by reference.

Alternatively, the result packet may be an out-of-band result packet, e.g., a metric result packet (MRP), which is generated in response to an out-of-band request packet from the measurement unit 120 and then transmitted to the measurement unit 120. An example of a suitable technique for using an out-of-band result packet is disclosed in U.S. Pat. No. 8,661,292 to Stevens et al., issued on Feb. 25, 2014, which is incorporated herein by reference.

The optional packet-routing engine 130 facilitates communications between the measurement unit 120 and the probes 110. The probes 110 may be discovered, configured, and synchronized through the packet-routing engine 130. The optional packet-routing engine 130 also facilitates routing of the result packets from the probes 110 to the measurement unit 120.

The measurement unit 120 receives the result packets from the probes 110, optionally, via the packet-routing engine 130. The measurement unit 120 uses the latched packet and byte counts for the flow at different probes 110 and the corresponding trigger timestamps to provide key performance indicators (KPIs), such as packet loss, byte loss, latency, and throughput. Preferably, the KPIs are generated as the result packets are received, i.e., in real time.

For each trigger packet, the measurement unit 120 compares the latched packet counts for the flow to measure packet loss for network segments defined by different probes 110. The latched packet count for the flow at an upstream probe 110 may be used as a reference count for any downstream probes 110. A packet loss for a network segment defined by two probes 110, i.e., between the network locations of two probes 110, is calculated as a difference between the latched packet counts corresponding to a particular trigger packet at the two probes 110, e.g., $C_1$-$C_2$ in FIG. 1. The packet loss may be converted to a rate defined as a percentage of the latched packet count for the flow at the upstream probe 110, e.g., $(C_1-C_2)/C_1$ in FIG. 1. In a similar manner, for each trigger packet, the measurement unit 120 compares the latched byte counts for the flow to measure byte loss for a network segment defined by different probes 110.

For each trigger packet, the measurement unit 120 also, typically, compares the trigger timestamps to measure latencies for network segments defined by different probes 110. A latency for a network segment defined by two probes 110, i.e., between the network locations of two probes 110, is calculated as a difference between the trigger timestamps for a particular trigger packet at the two probes 110, e.g., $T_2$-$T_1$ in FIG. 1. Furthermore, by using the trigger timestamp at each probe 110, the latched packet and byte counts for the flow at that probe 110 may be converted to a packet throughput, e.g., $C_1/T_1$ in FIG. 1, and a byte throughput, respectively.

Of course, such calculations may be extended to larger network segments defined by more than two probes 110. When the probes 110 are located at each hop in the network segment, KPIs may be determined on a hop-to-hop basis.

The measurement unit 120 stores the measurement results, as they are generated, in memory, typically, in a file or a database.

In a preferred embodiment, the measurement unit 120 identifies matching trigger packets, i.e., the same trigger packet at different probes 110, by performing deeper packet analysis on trigger packets captured in result packets. An example of a suitable technique for packet matching is described in U.S. Patent Application Publication No. 2014/0119231 to Chan et al., published on May 14, 2014, which is incorporated herein by reference.

In such an embodiment, the measurement unit 120 computes a packet signature for each of the captured trigger packets. As the trigger packets are received, i.e., in real time, the measurement unit 120 parses each trigger packet to compute a packet signature for that packet. Trigger packets captured at different probes 110, within a matching window, i.e., a predetermined time interval, having the same packet signature have a high likelihood to be the same trigger packet and are considered to be matching trigger packets. By comparing the packet signatures, matching trigger packets may be identified.

Depending on the network locations of the probes 110 at which they were captured, matching trigger packets may have different outer network encapsulations, e.g., Ethernet, virtual local area network (VLAN), and/or multi-protocol label switching (MPLS) encapsulations. However, matching trigger packets will maintain the same values in some inner header fields, referred to as invariant header fields, as they traverse the network 140. Suitable examples of invariant header fields include source and destination addresses, identifiers, and sequence numbers. Some of these invariant header fields have a high level of variance among non-matching packets and may be used, in combination, to uniquely identify sets of matching trigger packets.

In order to minimize computational costs, the packet signature is computed from a minimal set of invariant header fields, e.g., a minimum set of invariant header fields, that uniquely identifies a particular trigger packet throughout the network 140 within the matching window. The minimal set is a small subset of the invariant header fields present in the particular packet, generally, the smallest subset that will uniquely identify the particular trigger packet. The minimal set must be highly likely to vary from trigger packet to trigger packet within the matching window, but must not vary for a particular trigger packet as it traverses the network 140. The matching window is selected to be long enough to allow a trigger packet to traverse the network 140, but short enough to minimize the likelihood of the same signature being computed for different trigger packets.

In general, the minimal set must have the properties of (1) being able to uniquely identify a particular trigger packet throughout the network 140 for the lifetime of that packet, and (2) being invariant at different locations in the network 140. In other words, the minimal set must be distinct and invariant.

Accordingly, the minimal set depends on the particular protocol layers, e.g., network, transport, and/or application layers, present in the particular trigger packet, i.e., on the particular protocol combination of that packet. In general, minimal sets are predetermined for various protocol combinations. Typically, the minimal set includes an IP source address, an IP destination address, and at least one additional invariant header field, such as an identifier or a sequence number. For example, a minimal set for an IPv4 trigger packet may consist of an IPv4 source address, an IPv4 destination address, a non-zero IPv4 identifier, and an IPv4 fragment offset.

When parsing each captured trigger packet, the measurement unit 120 parses each protocol layer on the fly, i.e., dynamically. The measurement unit 120 parses the captured trigger packet header by header, i.e., layer by layer, from outside to inside. Based on how an outer header is parsed, the measurement unit 120 determines the next header to parse and how to parse it, and so on.

For some captured trigger packets having particular protocol combinations, the measurement unit 120 will determine that a minimal set is not obtainable. In general, a minimal set is not obtainable for protocol combinations having no known identifier or sequence number that can potentially uniquely identify a particular trigger packet at different network locations.

For each captured trigger packet for which a minimal set is obtained, the measurement unit 120 computes a packet signature from the minimal set of invariant header fields. The measurement unit 120 stores the packet signature of the captured trigger packet in memory, along with the latched packet counts, the trigger timestamp, and, preferably, the probe identifier. Typically, the packet signature is stored in memory along with the captured trigger packet. A packet signature is not computed for captured trigger packets for which a minimal set is not obtained, and these packets will not usually be stored or used for identifying matching trigger packets. The measurement unit 120 compares the packet signatures of the captured trigger packets to identify matching trigger packets, i.e., the same trigger packet captured at different network locations.

In an exemplary embodiment, the measurement unit 120 computes the packet signature by applying a hash function, e.g., MurmurHash2, to the minimal set of invariant header fields. A 64-bit packet signature is usually sufficient for uniqueness and efficiency. The measurement unit 120 stores the captured trigger packets in a hash table indexed by the packet signature, referred to as a packet hash table. The measurement unit 120 also forms an ordered queue of references to the captured trigger packets according to trigger timestamp, referred to as a packet queue. Both the packet hash table and the packet queue are stored in memory.

In this embodiment, upon receipt of a new captured trigger packet, its packet signature is computed as described heretofore. The measurement unit 120 inserts the captured trigger packet into the packet hash table by packet signature. As multiple captured trigger packets may have the same packet signature, a hash table implementation is selected that can handle this. The measurement unit 120 also inserts a reference to the captured trigger packet into the packet queue by trigger timestamp.

The measurement unit 120 receives captured trigger packets over a predetermined time interval, e.g., 0.1 to 1 s, referred to as a matching window. The matching window should be long enough to encompass the worst-case lifetime of a packet traversing the network 140, but short enough to not degrade the uniqueness of the packet signature. Usually, the matching window is specified by a user and is based on the service level agreement (SLA) for the network 140 under test.

The measurement unit 120 then looks at the head of the packet queue. If the packet reference at the head of the packet queue has been there for the predetermined time interval of the matching window, the measurement unit 120 finds all of the captured trigger packets having the same packet signature as the referenced trigger packet in the packet hash table. These packets, referred to as matching trigger packets, represent the same trigger packet captured at different network locations. The measurement unit 120 removes the matching trigger packets from the packet hash table and removes the references to the matching trigger packets from the packet queue. If the measurement unit 120 does not find any trigger packets having the same packet signature as the referenced trigger packet, that packet is simply discarded.

Once matching trigger packets have been identified in this manner, the measurement unit 120 determines uses the latched packet and byte counts for the flow at different probes 110 and the corresponding trigger timestamps to provide key performance indicators (KPIs), as described heretofore.

A user interface, e.g., a graphical user interface (GUI), may be implemented as part of the measurement unit 120 or separately. The user interface allows a user to select the probes 110 to be used, to set the filters at those probes 110, and to set measurement options. The user interface also receives results from the measurement unit 120 and provides those results to the user.

Figure 2:
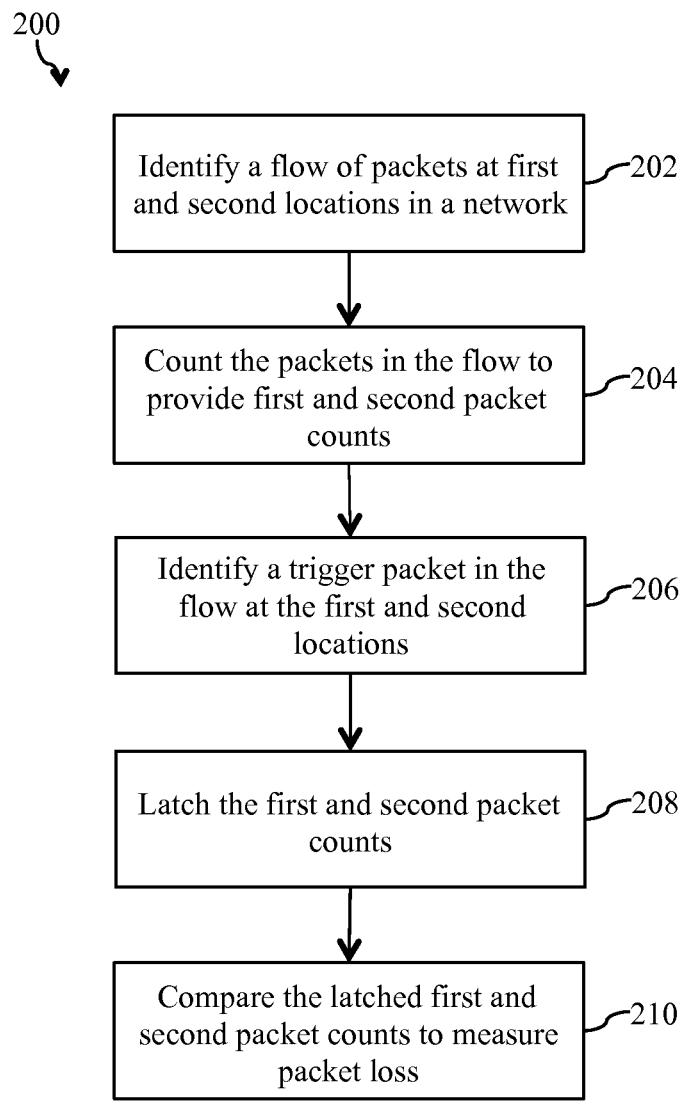
FIG. 2 is a schematic illustration of a second embodiment of a system for measuring packet loss.

With reference to FIG. 2, a first embodiment of a method 200 for measuring packet loss is used for passive measurements and may be implemented using the system 100 of FIG. 1. At step 202, a flow of packets is identified at each of first and second locations in the network 140 under test, by first and second probes 110. At step 204, the packets in the flow are counted at each of the first and second locations, by the first and second probes 110, to provide first and second packet counts, respectively. At step 206, a trigger packet, i.e., a predetermined packet, in the flow is identified at each of the first and second locations, by the first and second probes 110. At step 208, the first and second packet counts are latched, by the first and second probes 110, upon identifying the trigger packet at each of the first and second locations, respectively, to provide latched first and second packet counts, which correspond to the same packets in the flow. At step 210, the latched first and second packet counts are compared, by the measurement unit 120, to measure packet loss between the first and second locations.

Figure 3:
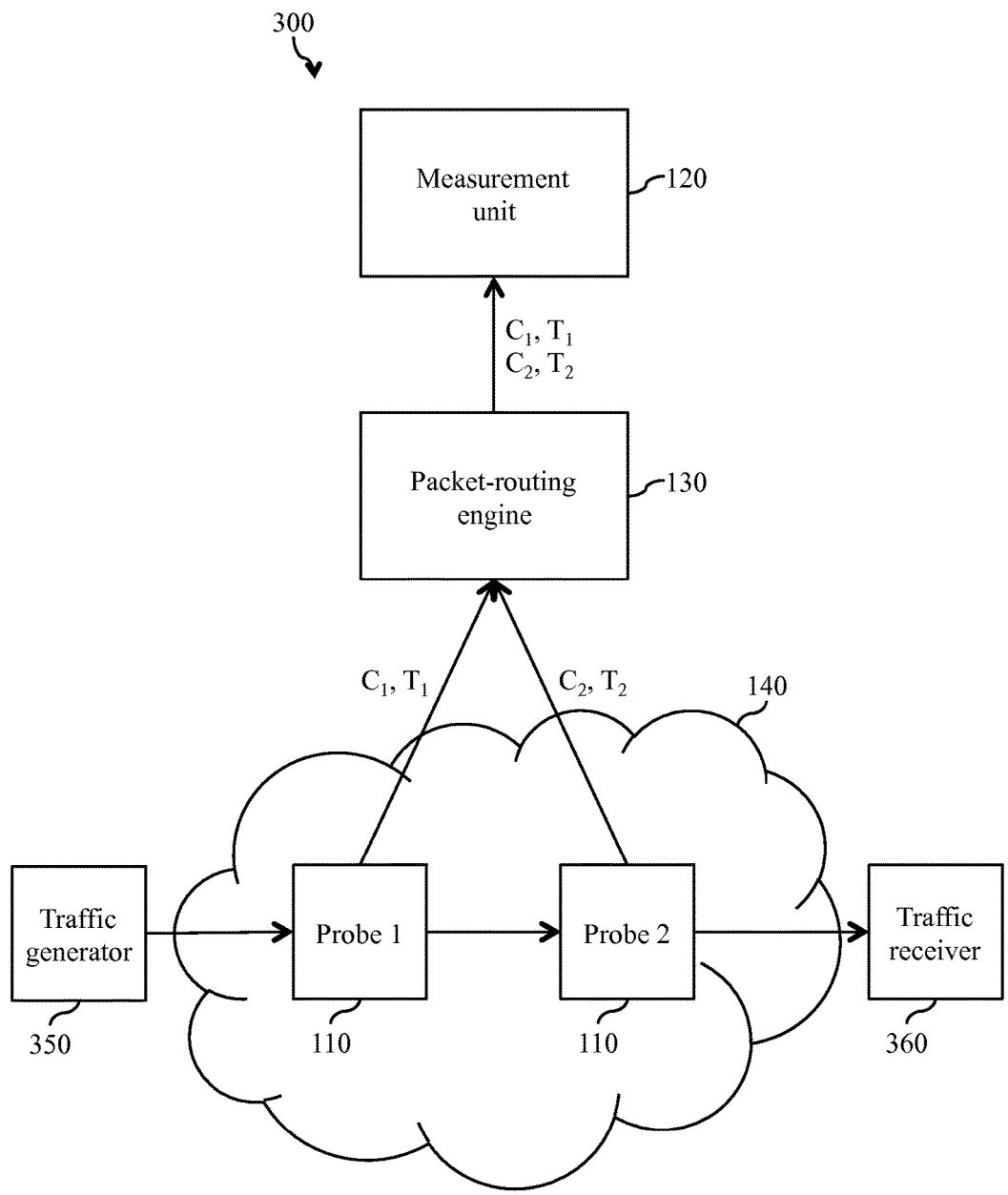
FIG. 3 is a flow diagram of a first embodiment of a method of measuring packet loss.

With reference to FIG. 3, a second embodiment of a system 300 for measuring packet loss is used for active measurements. The second embodiment of the system 300 is similar to the first embodiment, but further includes a traffic generator 350 and a traffic receiver 360, e.g., a loopback device.

The traffic generator 350 generates a flow of test packets directed to the traffic receiver 360. Typically, the flow of test packets is generated continuously throughout a measurement, i.e., without any quiet periods.

Accordingly, all the test packets in the flow have a common source address and destination address. On the other hand, the test packets in the flow may be uniquely identified by an attribute that varies from test packet to test packet within the flow, such as an identifier or a sequence number. For example, in addition to the identifier, sequence number, and checksum examples described heretofore with respect to the first embodiment, the traffic generator 350 may insert a sequence number into the payload of the test packets. Such an attribute is used to distinguish predetermined test packets, which serve as trigger packets, from other test packets in the flow. As described heretofore, the probes 110 are each configured with a flow filter that defines the flow of interest, in this embodiment, the flow of test packets, and a trigger filter that defines the trigger packets in the flow, in this embodiment, the predetermined test packets.

In general, other aspects of the second embodiment of the system 300 are the same as those of the first embodiment described heretofore.

Figure 4:
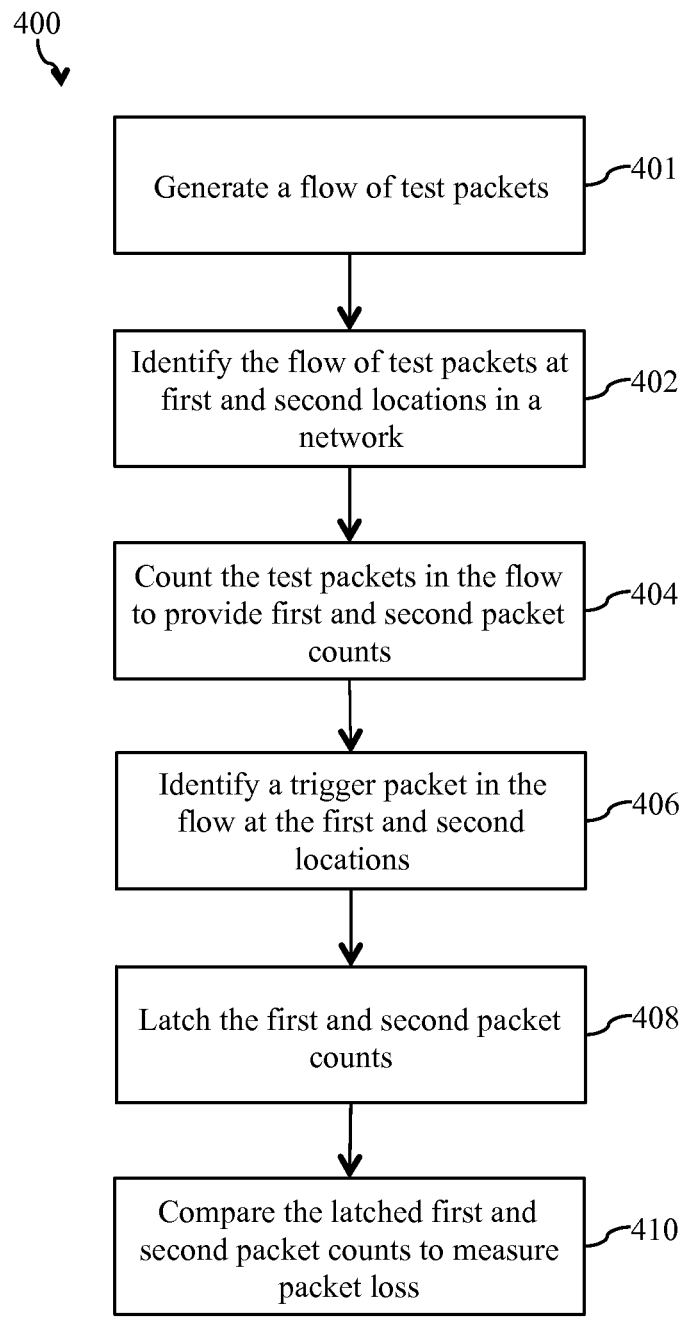
FIG. 4 is a flow diagram of a second embodiment of a method of measuring packet loss.

With reference to FIG. 4, a second embodiment of a method 400 for measuring packet loss is used for active measurements and may be implemented using the system 300 of FIG. 3. At step 401, a flow of test packets is generated by the traffic generator 350. At step 402, the flow of test packets is identified at each of first and second locations in the network 140 under test, by first and second probes 110. At step 404, the test packets in the flow are counted at each of the first and second locations, by the first and second probes 110, to provide first and second packet counts, respectively. At step 406, a trigger packet, i.e., a predetermined test packet, in the flow is identified at each of the first and second locations, by the first and second probes 110. At step 408, the first and second packet counts are latched, by the first and second probes 110, upon identifying the trigger packet at each of the first and second locations, respectively, to provide latched first and second packet counts, which correspond to the same test packets in the flow. At step 410, the latched first and second packet counts are compared, by the measurement unit 120, to measure packet loss between the first and second locations.

Of course, numerous other embodiments may be envisaged without departing from the spirit and scope of the invention.

We claim:

1. A method, comprising:
    receiving, by a device, a first packet associated with a first location in a network and a second packet associated with a second location in the network,
    the first packet and the second packet being generated based on:
        counting packets, in a flow of packets, at each of the first location and the second location, to generate a first packet count and a second packet count, respectively,
        identifying a series of trigger packets, included in the flow of packets, at the first location and the second location independent of altering the flow of packets at any of the first location or the second location,
            the first location and the second location each having a probe configured with a trigger filter that defines a predetermined packet in the flow of packets as a trigger packet of the series of trigger packets,
        iteratively latching the first packet count and the second packet count to generate a latched first packet count and a latched second packet count based on identifying each trigger packet in the series of trigger packets, and
        generating the first packet and the second packet,
            the first packet including the latched first packet count and the second packet including the latched second packet count; and measuring, by the device, a key performance indicator associated with the network, between the first location and the second location, based on the first packet and the second packet.

2. The method of claim 1, where the key performance indicator includes at least one of:
- a packet loss between the first location and the second location,
- a byte loss between the first location and the second location,
- a latency between the first location and the second location, or
- a throughput between the first location and the second location.

3. The method of claim 1, further comprising:
comparing the latched first packet count and the latched second packet count to measure a packet loss between the first location and the second location.

4. The method of claim 1, further comprising:
comparing a first timestamp, associated with the first packet and a second timestamp, associated with the second packet, to measure a latency between the first location and the second location.

5. The method of claim 4, further comprising:
utilizing the latched first packet count and the first timestamp to calculate a first throughput at the first location;
utilizing the latched second packet count and the second timestamp to calculate a second throughput at the second location; and
comparing the first throughput and the second throughput to measure a throughput between the first location and the second location.

6. The method of claim 1, where the flow of packets is part of existing network traffic or is a flow of test packets.

7. The method of claim 1, further comprising:
storing the key performance indicator; and
providing the key performance indicator for display.

8. A device, comprising:
one or more processors to:
receive a first packet associated with a first location in a network and a second packet associated with a second location in the network,
the first packet and the second packet being generated based on:
counting packets, in a flow of packets, at each of the first location and the second location, to generate a first packet count and a second packet count, respectively,
identifying a series of trigger packets, included in the flow of packets, at the first location and the second location independent of altering the packets at any of the first location or the second location,
the first location and the second location each having a probe configured with a trigger filter that defines a predetermined packet in the flow of packets as a trigger packet of the series of trigger packets,
iteratively latching the first packet count and the second packet count to generate a latched first packet count and a latched second packet count based on identifying each trigger packet in the series of trigger packets, and
generating the first packet and the second packet,
the first packet including the latched first packet count and the second packet including the latched second packet count; and
measure a key performance indicator associated with the network, between the first location and the second location, based on the first packet and the second packet.

9. The device of claim 8, where the key performance indicator includes at least one of:
- a packet loss between the first location and the second location,
- a byte loss between the first location and the second location,
- a latency between the first location and the second location, or
- a throughput between the first location and the second location.

10. The device of claim 8, where the one or more processors are further to:
compare the latched first packet count and the latched second packet count to measure a packet loss between the first location and the second location.

11. The device of claim 8, where the one or more processors are further to:
compare a first timestamp, associated with the first packet, and a second timestamp, associated with the second packet, to measure a latency between the first location and the second location.

12. The device of claim 11, where the one or more processors are further to:
utilize the latched first packet count and the first timestamp to calculate a first throughput at the first location;
utilize the latched second packet count and the second timestamp to calculate a second throughput at the second location; and
compare the first throughput and the second throughput to measure a throughput between the first location and the second location.

13. The device of claim 8, where the flow of packets is part of existing network traffic or is a flow of test packets.

14. The device of claim 8, where the one or more processors are further to:
store the key performance indicator; and
provide the key performance indicator for display.

15. A system, comprising:
one or more devices to:
identify a flow of packets at each of a first location in a network and a second location in the network;
count packets, in the flow of packets, at each of the first location and the second location, to generate a first packet count and a second packet count, respectively;
identify a series of trigger packets, in the flow of packets, at the first location and at the second location independent of altering the flow of packets at any of the first location or the second location,
the first location and the second location each having a probe configured with a trigger filter that defines a predetermined packet in the flow of packets as a trigger packet of the series of trigger packets;
iteratively latch the first packet count and the second packet count, based on identifying each trigger packet in the series of trigger packets, to generate a latched first packet count and a latched second packet count;
generate a first packet and a second packet;
the first packet including the latched first packet count and the second packet including the latched second packet count; and measure a key performance indicator associated with the network, between the first location and the second location, based on the first packet and the second packet.

16. The system of claim 15, where the key performance indicator includes at least one of:
a packet loss between the first location and the second location,
a byte loss between the first location and the second location,
a latency between the first location and the second location, or
a throughput between the first location and the second location.

17. The system of claim 15, where the one or more devices are further to:
compare the latched first packet count and the latched second packet count to measure a packet loss between the first location and the second location.

18. The system of claim 15, where the one or more devices are further to:
compare a first timestamp, associated with the first packet, and a second timestamp, associated with the second packet, to measure a latency between the first location and the second location.

19. The system of claim 18, where the one or more devices are further to:
utilize the latched first packet count and the first timestamp to calculate a first throughput at the first location;
utilize the latched second packet count and the second timestamp to calculate a second throughput at the second location; and
compare the first throughput and the second throughput to measure a throughput between the first location and the second location.

20. The system of claim 15, where the flow of packets is part of existing network traffic or is a flow of test packets.

* * * * *